J. A. HALL.
DUSTPAN.
APPLICATION FILED APR. 27, 1921.
1,424,761.
Patented Aug. 8, 1922.
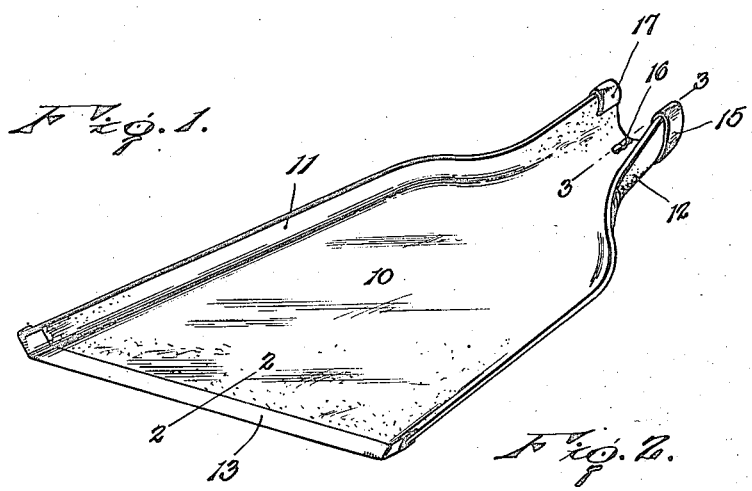
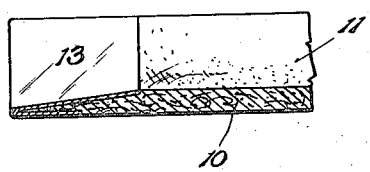
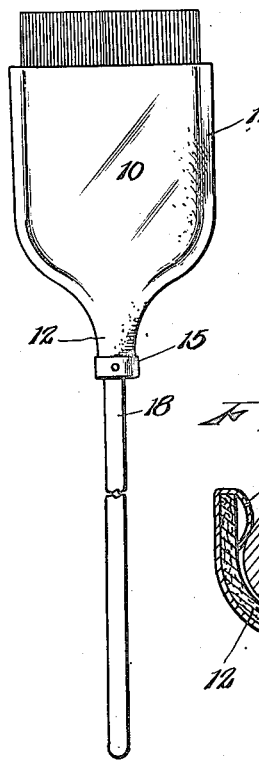
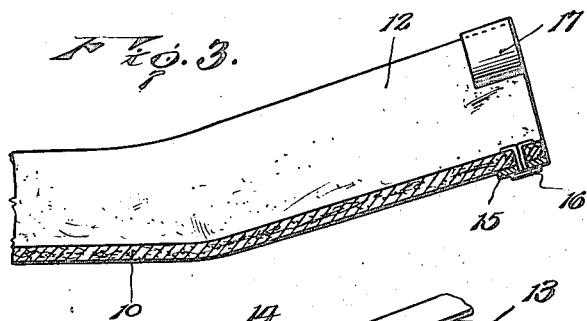
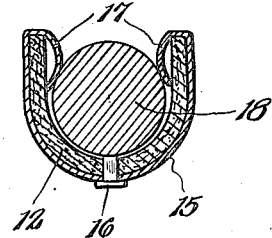
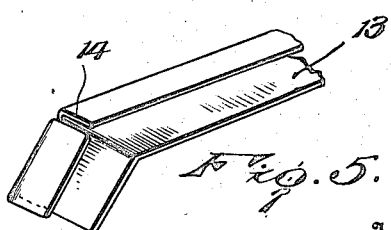
Inventor
J. A. Hall.
By Lacey & Lacey, Attorneys

UNITED STATES PATENT OFFICE.

JOHN A. HALL, OF UNION, NEW HAMPSHIRE, ASSIGNOR OF ONE-HALF TO HENRY A. TOWNSEND, OF MILTON MILLS, NEW HAMPSHIRE.

DUSTPAN.

1,424,761.  Specification of Letters Patent.  Patented Aug. 8, 1922.

Application filed April 27, 1921. Serial No. 464,869.

*To all whom it may concern:*

Be it known that I, JOHN A. HALL, citizen of the United States, residing at Union, in the county of Carroll and State of New Hampshire, have invented certain new and useful Improvements in Dustpans, of which the following is a specification.

This invention relates to a dust pan and has as one of its principal objects to provide a device of this character wherein the body of the pan will be formed of fiber and will thus be free from rust as well as objectionable denting and bending such as is incident to the ordinary metal pan.

The invention has as a further object to provide a dust pan wherein the body thereof will be formed of one piece.

A still further object of the invention is to provide a pan wherein the forward margin of the pan will be amply protected by a suitable binding strip and wherein said strip will be so shaped as to provide a thin edge at the forward end of the pan.

A still further object of the invention is to provide a pan employing a shape retaining spring for the handle of the pan body and wherein when desired, said spring may be readily removed.

And the invention has as a still further object to provide a pan wherein the shape retaining spring for the handle of the body will be adapted to grip a broom handle for supporting the pan, when not in use, upon the broom.

Other and incidental objects will appear hereinafter.

In the drawing:

Figure 1 is a perspective view of my improved pan,

Figure 2 is an enlarged fragmentary section on the line 2—2 of Figure 1,

Figure 3 is an enlarged fragmentary section on the line 3—3 of Figure 1,

Figure 4 is a transverse section at right angles to Figure 3, particularly showing the shape retaining spring of the handle of the pan, Figure 5 is a fragmentary perspective view showing one end portion of the binding strip of the pan, and Figure 6 is an elevation showing the pan in connection with an ordinary broom.

In carrying the invention into effect, I employ a pan body 10 bent upwardly at its side margins to form sides 11 while the rear end portion of the body is reduced to provide an upwardly inclined handle 12. The body is preferably constructed from a single piece of suitable fiber so that the body will thus not be subject to corrosion and will also not become dented or bent as is so often experienced in connection with ordinary metal pans. Mounted upon the body at its forward end is a binding strip 13. This binding strip is preferably of suitable resilient sheet metal and is substantially V-shaped in cross section, being provided with a wide upper flange overlying the upper face of the body and a narrow lower flange extending beneath the body. In this connection, it will be observed that said flanges are countersunk in the material of the body so as to provide smooth surfaces both at the upper and lower sides of the body while the body is skived or provided at its upper side with a beveled face so that the upper flange of the binding strip inclines upwardly and rearwardly from the forward edge of the strip into the body. This feature will, of course, facilitate the operation of brushing sweepings into the pan and by employing a V-shaped binding strip, said strip is provided with a relatively thin forward edge so that all of the sweepings may be readily gathered into the pan. At the junction of the side walls 11 with the bottom wall of the body, the lower flange of the binding strip 13 is, as shown in detail in Figure 5, provided with notches 14, the end portions of the strip being bent up from said notches so that said end portions of the strip will tend to retain the side walls in upwardly and outwardly inclined relation with respect to the bottom wall. The handle 12 is substantially channel shaped and embracing the handle at its free end is a substantially U-shaped retaining spring 15. As best shown in Figures 3 and 4, the spring is provided medially with an opening registering with a similar opening through the handle and removably engaging through said openings is a fastener 16 securing the spring in position. At its ends the spring is, as shown in detail in Figure 4, provided with loops embracing the margins of the handle and the free end portions of these loops are bowed longitudinally to provide a pair of confronting jaws 17 lying within the handle. The spring may be constructed of any approved material and, as will now be appreciated, said spring will act against the sides of the handle for retaining the channel shape thereof. In providing a handle of this character, sweepings in the dust pan may, when it is desired to empty the sweepings into a stove for instance, as is very often done, the sweepings may be brushed through the handle and spilling of the sweepings thus prevented.

In Figure 6, I have shown the dust pan arranged upon a broom 18 of conventional design. As shown in Figure 4, the handle 12 of the pan is shaped to snugly receive the broom handle therethrough while the jaws 17 are disposed to frictionally coact with the handle gripping the handle for sustaining the pan thereon. Consequently, when the dust pan is not in use, the pan may, as suggested, be arranged in inverted position overlying the body of the broom. In attaching the pan to the broom, the jaws 16 will, of course, readily ride over the handle and will likewise facilitate disengagement of the pan from the handle. It will accordingly be seen that I provide a particularly effective construction for the purpose set forth and a dust pan which, in practice, will not only prove highly efficient but will also be found especially durable.

Having thus described the invention, what is claimed as new is:

1. A dust pan including a fibrous body reduced at one end portion to provide a channel shaped handle, and a retaining spring embracing the handle and provided with coacting jaws lying within the handle.

2. A dust pan including a fibrous body reduced at one end portion to provide a channel shaped handle, and a substantially U-shaped retaining spring embracing the handle and provided at its free ends with loops extending over the upper edges of the sides of the handle and terminating in coacting jaws lying within the handle.

3. In a dust pan, the combination of a fibrous body formed at one end to provide a handle, a shape retaining spring carried by the handle, and means coacting between the spring and handle detachably connecting the spring therewith.

4. In a dust pan, the combination of a fibrous body formed at one end to provide a handle, and a shape retaining spring carried by the handle and provided with means to coact with the handle of a broom for securing the pan upon the broom.

5. In a dust pan, the combination of a fibrous body formed at one end to provide a handle having spaced sides, and a shape retaining spring carried by the handle acting to resiliently support the sides thereof against movement away from each other.

In testimony whereof I affix my signature.

JOHN A. HALL. [L. S.]